United States Patent [19]

Hashimoto

[11] Patent Number: 4,878,243
[45] Date of Patent: Oct. 31, 1989

[54] CALL FORWARDING SYSTEM AND METHOD

[75] Inventor: Kazuo Hashimoto, Tokyo, Japan

[73] Assignee: Hashimoto Corporation, Tokyo, Japan

[21] Appl. No.: 77,928

[22] Filed: Jul. 27, 1987

[30] Foreign Application Priority Data

Jul. 25, 1986 [JP] Japan ................................ 61-174990

[51] Int. Cl.⁴ ........................ H04M 1/64; H04M 3/54
[52] U.S. Cl. ...................................... 379/211; 379/67; 379/210
[58] Field of Search .................... 379/211, 67, 82, 210

[56] References Cited

U.S. PATENT DOCUMENTS

| 4,475,009 | 10/1984 | Rais et al. | 379/211 |
| 4,670,628 | 6/1987 | Boratgis et al. | 379/69 |
| 4,670,900 | 6/1987 | Waldman | 379/211 |
| 4,674,115 | 6/1987 | Kaleita et al. | 379/201 |
| 4,677,663 | 6/1987 | Szlam | 379/211 |
| 4,720,853 | 1/1988 | Szlam | 379/211 |
| 4,768,221 | 8/1988 | Green et al. | 379/67 |
| 4,768,224 | 8/1988 | Waldman | 379/211 |
| 4,807,279 | 2/1989 | McClure et al. | 379/211 |

FOREIGN PATENT DOCUMENTS

3032928 3/1982 Fed. Rep. of Germany ...... 379/211

Primary Examiner—Thomas W. Brown
Attorney, Agent, or Firm—Lowe, Price, LeBlanc, Becker & Shur

[57] ABSTRACT

A call forwarding device forwards calls from a calling party via private equipment B operating in a call forwarding mode to a predetermined called party identified by a preprogrammed telephone number. The device is remotely controllable by the calling party over the telephone lines to cancel the call forwarding mode of the device and to reprogram the call forwarding telephone number.

2 Claims, 6 Drawing Sheets

| RAM NUMBER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| TELEPHONE NUMBER | | 4 | 1 | 0 | 2 | 2 | 6 | 6 | | 1 | 4 | 2 | 1 | | |
| CODE | 00 | 04 | 01 | 0A | 02 | 02 | 06 | 06 | 00 | 01 | 04 | 02 | 01 | 00 | 00 |

(HEXADECIMAL)

FIG.5(B)

| RAM NUMBER | 1 | 2 | 3 | 4 | 5 | 6 | 7 |
|---|---|---|---|---|---|---|---|
| TELEPHONE NUMBER | | 1 | 4 | 2 | 0 | | |
| CODE | 00 | 01 | 04 | 02 | 0A | 00 | 00 |

(HEXADECIMAL)

FIG. 6

CALL FORWARDING SYSTEM AND METHOD

BACKGROUND OF INVENTION

The present invention relates to a telephone call forwarding system and more particularly to a telephone call forwarding system that is controlled remotely.

In conventional call forwarding, there are two systems, one wherein a central office handles operation, and the other, referred to as a call diverter, wherein privately owned equipment handles operation. The former uses one telephone line, whereas the latter requires two separate telephone lines because receiving and sending are to be simultaneously performed. In the former system, wherein the central office carries out the call forwarding service with one telephone line, it is difficult for the subscriber to remotely cancel the call forwarding service or to change the telephone number of the call forwarded party.

SUMMARY OF THE INVENTION

It is an object of the present invention to enable changing the call forwarded party or cancelling the call forwarding mode of operation by selective remote control operation by means of a difference in the calling signal which is generated by a subscriber calling from a remote location to set selectively call forwarding or normal operation and to re-program the telephone number of the call forwarded party.

The above and other objects, features and advantages of the preset invention will become more apparent from the following description when taken in conjunction with the accompanying drawings in which preferred embodiments of the present invention are shown by way of illustrative example.

BRIEF DESCRIPTION OF THE DRAWINGS

FIGS. 5 (A) and 5 (B) are diagrams which shows forwarded telephone numbers and commands that are stored in RAM to register in the central office.

DESCRIPTION OF THE PREFERRED EMBODIMENTS

The detailed description of the preferred embodiments according to the present invention will be now described with reference to the accompanying drawings.

Figure 1:
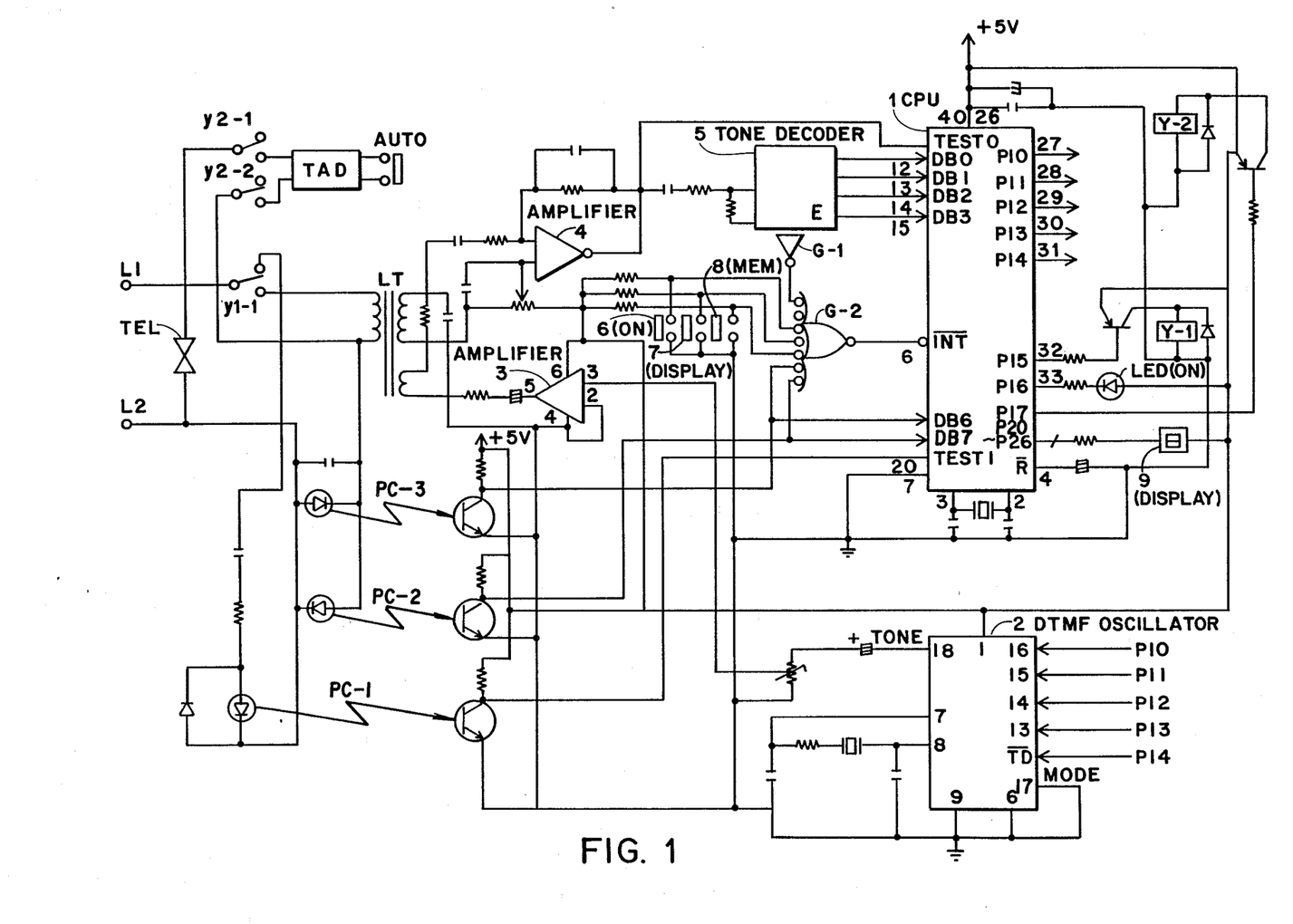
FIG. 1 is a circuit diagram of the preferred embodiments.

Referring to FIG. 1, reference symbols L1 and L2 denote telephone lines. Reference symbol LT denotes a line transformer. Reference symbol PC-1 denotes a photocoupler for detecting the particular calling signal that arrives while the normal calling signal or call forwarding function is being set up; and PC-2 and PC-3 are photocouplers for detecting the on-hook operation of the calling party or the answer of the called party. Reference symbol TAD denotes a telephone answering device, wherein any telephone answering device on the market can be connected. Reference numeral 1 denotes a one chip microcomputer, wherein an INTEL 8048 is used in the present embodiment, data buses DB0 and DB7 are input terminals, reference symbols P10 to P17 and P20 to P27 denote output ports and reference symbol $\overline{INT}$ denotes an interrupt terminal. Reference numeral 2 denotes a DTMF oscillator for generating an oscillating push phone DTMF tone, which outputs tones of 0 to 9, * and # according to the code of said output ports P10 to P13. Reference numerals 3 and 4 denote amplifiers. Reference numeral 5 denotes a tone decoder for decoding into a binary code the DTMF tone that is received from outside. Reference numeral 6 (ON) denotes a switch for setting the present device to the operation mode; and 7 (DISPLAY) and 8 (MEM), switches for entering the telephone number when the specified person (remote control operator) is automatically called from the present device. Reference symbol Y-1 denotes a relay for loop making which engages the present device to change the call forwarded party; and Y-2, a relay for switching which is energized with the normal calling signal and switches the calling signal to the telephone answering device TAD.

The present device is arranged as described above. Operation will be described with reference to flow charts FIGS. 2 to 4 and diagrams 5(A) and 5(B).

In the first embodiment, it is arranged that the specified person (remote control operator) is automatically called from the present device in case of a change of the telephone number of the call forwarded party described later. Accordingly, it is necessary to enter beforehand the telephone number of said specified person into the present device. Thus, the switch 7 is pressed once and then on the display 9 a "1" appears first. The switch 7 is pressed again and then "2" is displayed. It is arranged that the digits "1", "2", . . . ."0" appear one by one on the display 9 by pressing the switch 7. Accordingly, if "4" is the first digit of said specified person's telephone number, the switch 7 is pressed four times and then "4" appears on the display 9. The switch 8 is now pressed and then the code of "4" is stored in the predetermined memory incorporated in CPU 1. When the same operation is repeated and all digits of said telephone number are entered, the switch 6 is turned on to set the present device to the call forwarding mode.

Further, it is assumed that call forwarding to the central office is entered beforehand to the central office. Incidentally, in the call forwarding system by NTT in Japan, dialing 0*19xxxxxxx (x is digit of call forwarded party's telephone number) and 1421 enables the entry of the call forwarded party.

Figure 2:
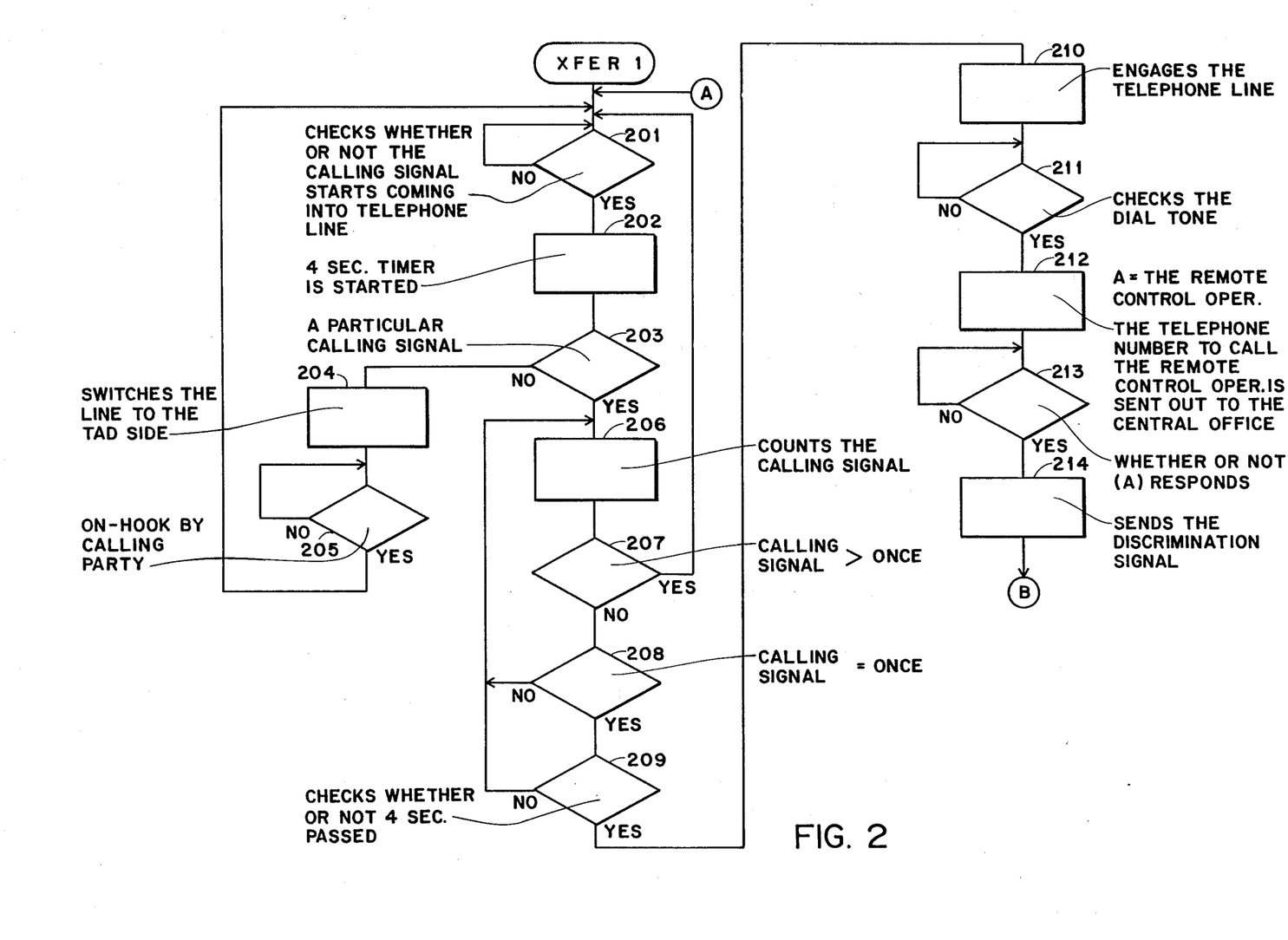
FIGS. 2-4 are flow charts of the operation of first embodiment.
Figure 3:
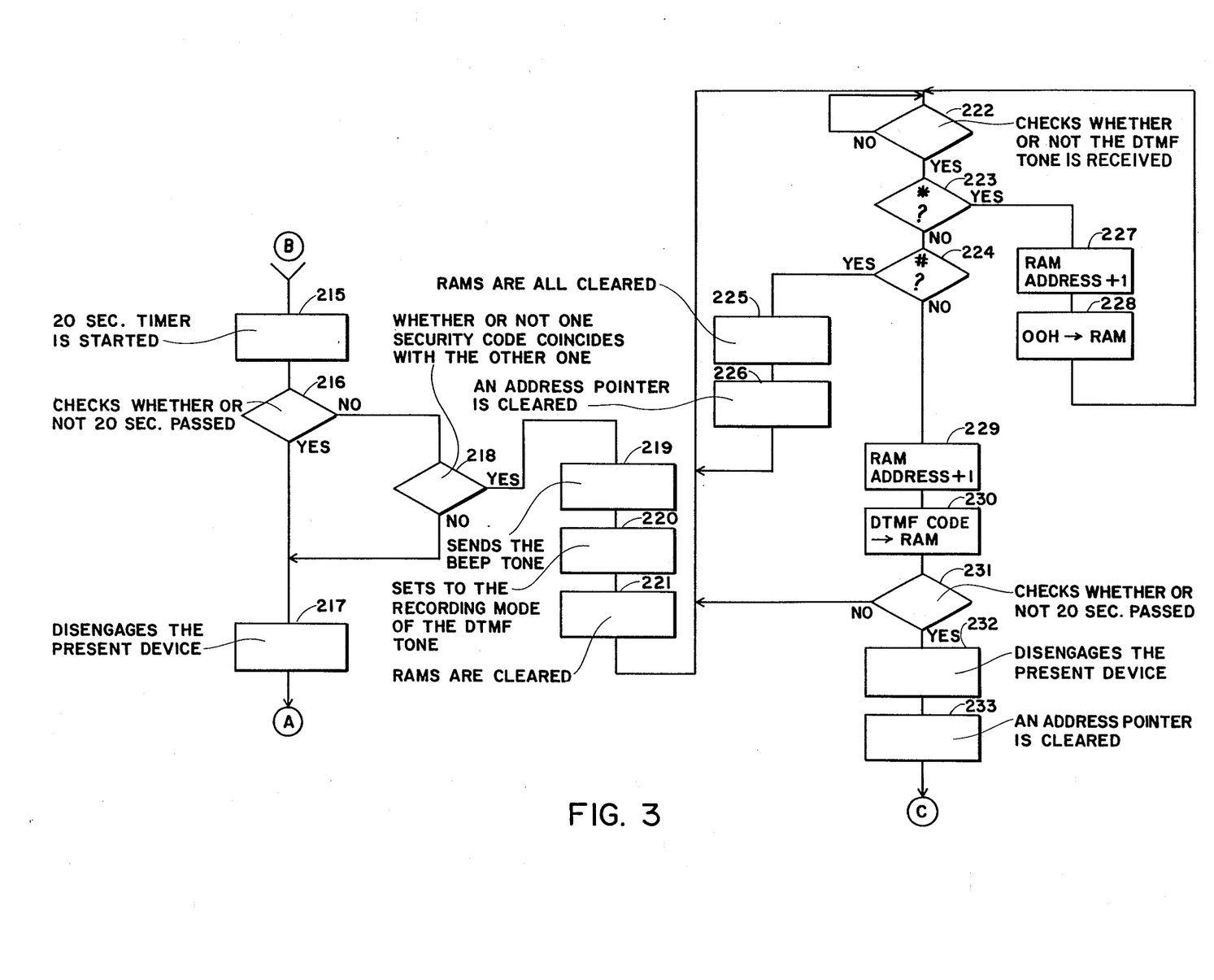

When the switch 6 in FIG. 1 is turned on, the program jumps to step 201 in FIG. 2. In step 201, CPU 1 checks whether or not the calling signal starts coming into the telephone lines L1 and L2. More particularly, when the calling signal comes into the telephone lines L1 and L2 in FIG. 1, a light-emitting diode of the photocoupler PC-1 flickers in response to a 16 Hz calling signal, as is clear from the figure. In response, a phototransistor of the PC-1 is energized intermittently. When it is detected that said phototransistor is energized first and an input terminal TEST 1 of the CPU 1 is turned into L level from H level, the program advances from step 201 to step 202. In step 202, a 4 sec. timer (described later) is started by the program. In next step 203, CPU 1 checks whether said calling signal is a particular one or a normal one. In Japan, the normal calling signal repeats ringing for one second and pausing for 2 seconds, whereas the particular calling signal that is registered in the central office repeats three or four times ringing for 0.5 second and pausing for 0.5 second. Convention in the United States for central office signals indicative of normal (usual) call signals and particular call signals corresponding to call forwarding is described in U.S. Pat. No. 4,677,663 to Szlam.

In the present embodiment, as a means to judge whether it is a normal calling signal or a particular calling signal for call forwarding, the counter function that is incorporated in the CPU 1 and connected to the input terminal TEST1 is used to count the waveform of 16 Hz calling signal. The count of waveforms of the normal calling signal that rings for 1 second amounts to 16, whereas that of the particular calling signal that rings for 0.5 second amounts to 8. Accordingly, in the present embodiment, in case of greater than 13 count of waveforms when the calling signal is being inputted continuously, said calling signal is normal, and in the case of a count of fewer than 13 and greater than 3, it is a particular calling signal.

When the calling signal is normal, the program advances from step 203 to step 204. In step 204, the output port P17 in the CPU 1 of FIG. 1 is maintained at an L level to energize the relay Y-2, and contacts y2-1 and y2-2 of the relay Y-2 are switched to the TAD side of the switch line. A conventional telephone answering device can be used here.

From now on, a detector incorporated in the TAD activates to engage the telephone lines. When the TAD is engaged, either of the photocouplers PC-2 or PC-3 which are inserted in series according to the polarity of the telephone lines is turned on. When the calling party finishes speaking his message and hangs up, or said TAD returns to the standby mode, said PC-2 or PC-3 which was turned on is turned off. The program detects it (step 205) and returns to step 201.

On the other hand, if the calling signal is particular, as described above, the program advances from step 203 to step 206. In step 206, the program counts the calling signal, i.e., obtains the number of times, not the waveform count, of the calling signal. As described above, in case of the particular calling signal, said calling signal is applied to the present device side three or four times. By the way, the remote control operator calls the present device and hears the ring back tone, then hangs up immediately in order to change the call forwarded party by the remote control operation, i.e., he hangs up before the central office calls the forwarding party, and he cancels the call forwarding function of the central office. In this way, when the remote control operator calls the present device and hangs up immediately after the ring back tone sounds, the calling signal (ring) stops ringing after one ring. Accordingly, if the program detects that the calling signal arrived once in step 208 through steps 206 and 207, and there is no change after the four seconds elapsed by said 4 sec. timer, the program advances to step 210 through the step 209.

In step 210, the output port P15 is turned to an L level and the relay Y-1 is turned on to engage the telephone lines by the contact y1-1 of said relay Y-1. In step 211, the program checks the dial tone. In step 212, the above telephone number to call the remote control operator (A) is sent out to the central office. When the remote control operator answers, the polarity of telephone lines is reversed, to be detected through the photocouplers PC-2 and PC-3 (step 213). At the time of answering by the remote control operator, in order to confirm that the present device calls him, the DTMF oscillator 2 is driven to generate a tone, such as Morse code, as a discrimination signal (step 214). The program advances to step 215 in FIG. 3 through a connector B.

In step 215, the program starts a 20 sec. timer. The 20 sec. timer is used for limiting the operation time by the remote control operator to change the telephone number of the call forwarded party or to cancel call forwarding. It is possible to detect, by interrupt, the polarity reversion when the remote control operator hangs up after the completion of the remote control operation.

In step 216, the program checks whether or not said 20 seconds have elapsed. If it is no longer necessary to change the call forwarded party or cancel the call forwarding, the remote control operator may hang up and then after 20 seconds the present device turns the relay Y-1 off to disengage the present device (step 217).

The present device returns to the standby mode of step 201 in FIG. 2 through a connector A. If the remote control operator wants to change the call forwarded party or to cancel the call forwarding, he sends the same security code as the one stored in a mask ROM of the CPU 1 (it may be arranged to change the security code by the external digital switch) by the operation on the keypad of the telephone (push-button telephone) at hand. When these two security codes coincide, the program advances from step 218 to step 219.

In step 219, the DTMF oscillator 2 sends a beep tone. In step 220, the present device is set to the recording mode of the DTMF tone used for changing the call forwarded party or canceling the call forwarding. More particularly, when the remote control operator sends the DTMF tone by operating on the keypad of the push-button telephone at hand, said tone is amplified by the amplifier 4 through the line transformer LT of FIG. 1, converted into the binary code by the tone decoder 5 and then applied to the input terminals DB0 and DB3 of the CPU 1. Said code is set to the condition where it can be stored in the predetermined position of the memory RAM incorporated in the CPU 1.

The CPU 1 used in the present device contains 64 byte RAMs, wherein the last bytes are used for storing the DTMF tone code. In step 221, said 20 byte RAMs are cleared. In step 222, the program checks whether or not the DTMF tone (telephone number) from the remote control operator arrives. When the DTMF tone is sent by the remote control operator and then decoded by the tone decoder 5, an output terminal E generates H level, so that the interrupt terminal INT is turned to be L level through an inverter F-1 and an OR gate G-2. Thus it is possible to check whether or not the DTMF tone arrives by checking the said terminal INT.

In step 223, the program checks whether or not said DTMF tone is "*". In the present embodiment, when the "*" tone arrives, "00" code is inputted to the corresponding RAM through steps 227 and 228. Further, when the "#" tone arrives in step 224, said 20 byte RAMs are all cleared through steps 225 and 226. Said "#" tone is used to reinput the telephone number after the failure. In step 226, an address pointer of the RAM (a register R0 or R1) is cleared (initialized) to appoint the first RAM of said 20 byte RAMs.

In order to enter into the device the call forwarded party's telephone number, for instance, "410-2266", "4" on the keypad of the push-button telephone is pressed initially. Now, the DTMF tone corresponding to "4" passes from step 222 through steps 223 and 224. In step 229, the address of the RAM is incremented by one. In step 230, the code of said telephone number digit "4" is stored in the corresponding RAM.

Figure 5A:
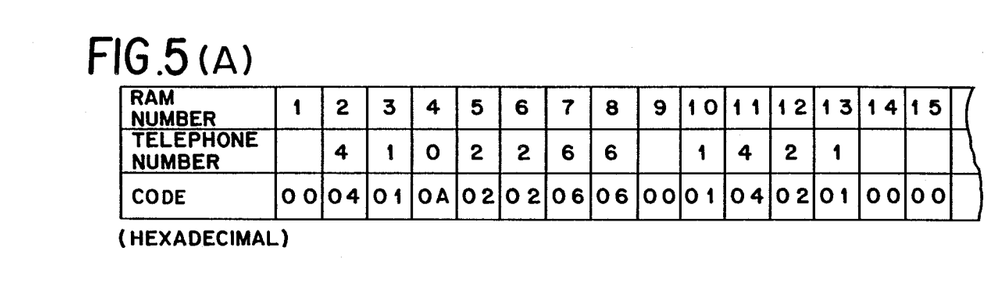

As described above, 20 byte RAMs are appointed for the telephone number, so that said RAM numbers are appointed RAM1 to RAM20 for convenience. However, as the address of the RAM was incremented by one in said step 229, the telephone number is stored from RAM2 as described in FIG. 5-A.

As the loop from step 231 to step 222 is repeated within 20 seconds, next digit of the telephone number "1" is entered and then the code "01" of said "1" is stored in RAM3 in FIG. 5-A. After the same operations are repeated and all digits of the telephone number "410-2266" are stored as shown in FIG. 5-A, the remote control operator presses "*" on the keypad and the code "00" is stored in RAM9 through steps 222, 223, 227 and 228. This code is for distinguishing the telephone number stored in the RAM from the command for starting the call forwarding (command to the central office) "1421". When "1", "4", "2" and "1" on the keypad are pressed successively after "*", the telephone number of the call forwarded party and the command for starting the call forwarding are entered into the device as shown in FIG. 5-A. Thus the remote control operator now hangs up and then the engaging is released after 20 seconds have elapsed in step 231. The address pointer is cleared for next remote control operation (steps 232 and 233) and the program advances to step 401 of FIG. 4 through a connector C.

Figure 4:
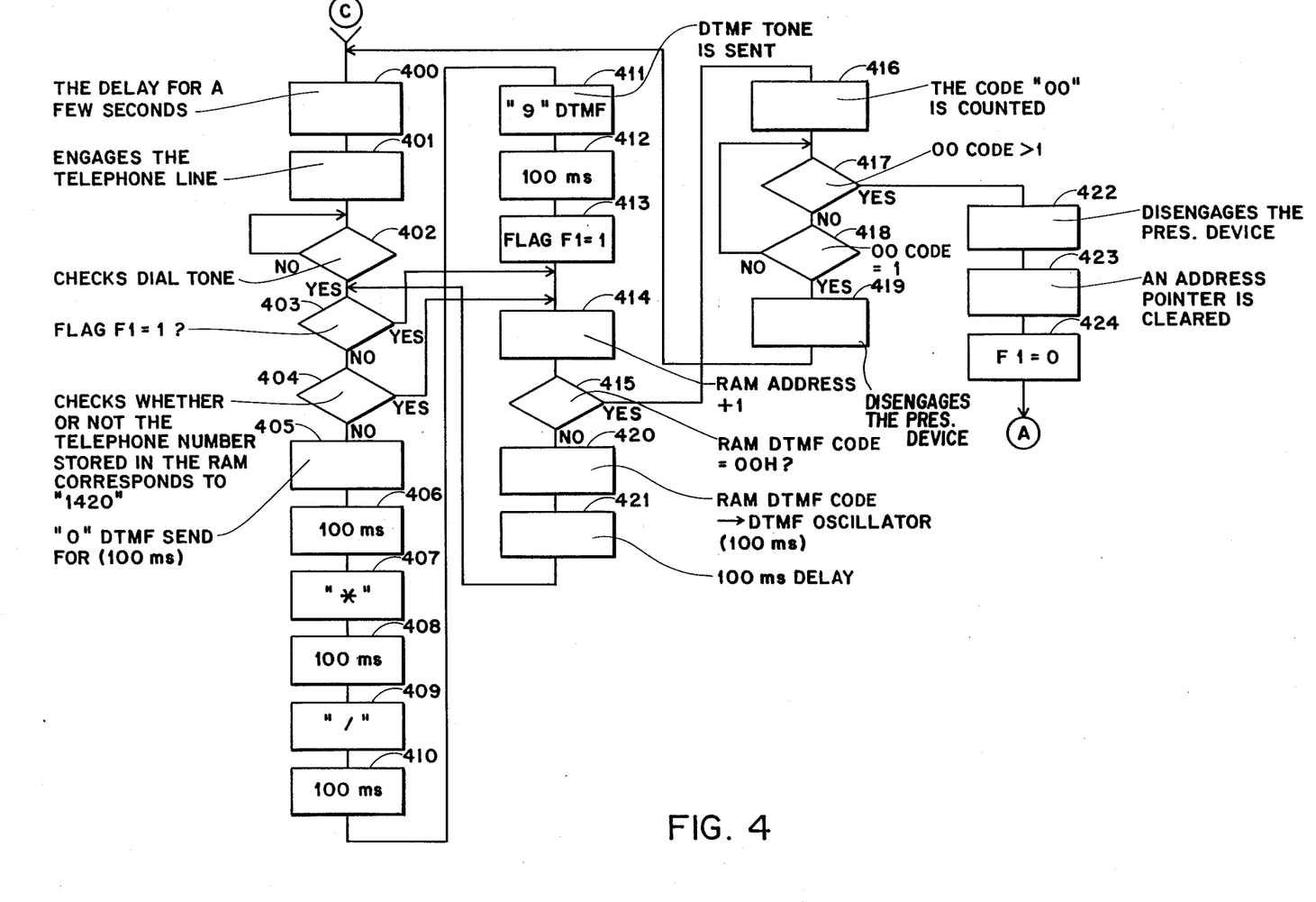

In the flow chart of FIG. 4, the telephone number of the call forwarded party and the command for starting the call forwarding stored in the device as described above are automatically registered into the central office. For registering into the central office, the number "0*19" is automatically added before said stored telephone number in the device. After a delay for a few seconds in step 400, the telephone lines are engaged and the program checks the dial tone (step 401 and 402) by introducing the output (alternating current) of the amplifier 4 into the output terminal TEST0 of the CPU. When the dial tone is inputted, the program checks whether or not a flag F1 is "1" in step 403. As the F1 will be set to "1" in step 413 after "0*19" is sent to the central office, the flag F1 is initially "0". Thus the program advances from step 403 to step 404.

In step 404, the program checks whether or not said telephone number stored in the RAM corresponds to "1420" for cancelling the call forwarding. Now the checking results in NO, so the program advances to step 405. In step 405, the DTMF tone corresponding to "0" is sent for 100 mS. After the minimum pause for 100 mS is set in step 406, the DTMF tone corresponding to "*" is sent for 100 mS. In the same way, the DTMF tones corresponding to "1" and "9" with the minimum pause between them are sent to the central office.

In step 413, said flag F1 is set to "1". The program advances to step 414. In step 414, the address of the RAM is incremented by one through the address pointer, so that RAM2 shown in FIG. 5-A is appointed initially. In step 415, the program checks whether or not the code of said RAM appointed above is "00". As said code is "004", the program advances to step 420. In step 420, the code for oscillating the telephone number corresponding to said RAM code is output to the DTMF oscillator from the output ports P10 and P13 and its oscillation output is sent to the lines through the amplifier 3. In step 421, the minimum pause is set. This operation is repeated until the code of the RAM reaches "00". Accordingly, the telephone number "410-2266" is sent out to the central office.

When the code "00" of RAM 9 is detected, the number of times of the code "00" is counted in step 416. When said number of times of the code "00" is confirmed to be one in step 418 through step 417, the lines are disengaged in step 419 and the program returns to step 401. Accordingly, as the flag F1 is "1" after the next reengaging, not "0-19" but "1421" in RAMs 10 to 13 is sent to the central office. As the code "00" in RAM14 is counted in step 417, the number of times of said code "00" becomes two, the checking results in YES, so that the program advances to step 422. The engaging is released, the address pointer is cleared, further the flag F1 is cleared and then the device returns to the standby mode in step 201 through a connector A. Accordingly, when the device receives an incoming call, said call is forwarded to said "410-2266".

Figure 5B:
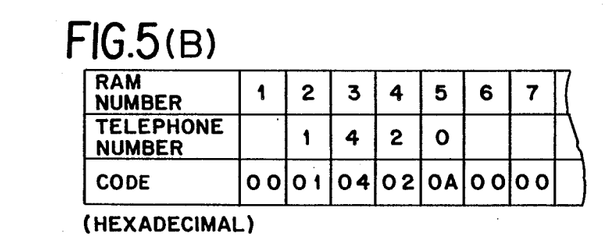

Further, in order to cancel the call forwarding, "1420" may be entered into the device at the time of said remote control operation. Said "1420" is stored in the RAM as shown in FIG. 5-B. When said number is to be sent to the central office, the checking results in YES in above step 404 and not "0*19" but "1420" alone is sent to the central office. When said number "1420" is registered into the central office, the incoming call to the device is not forwarded and normal calling signal sounds.

Figure 6:
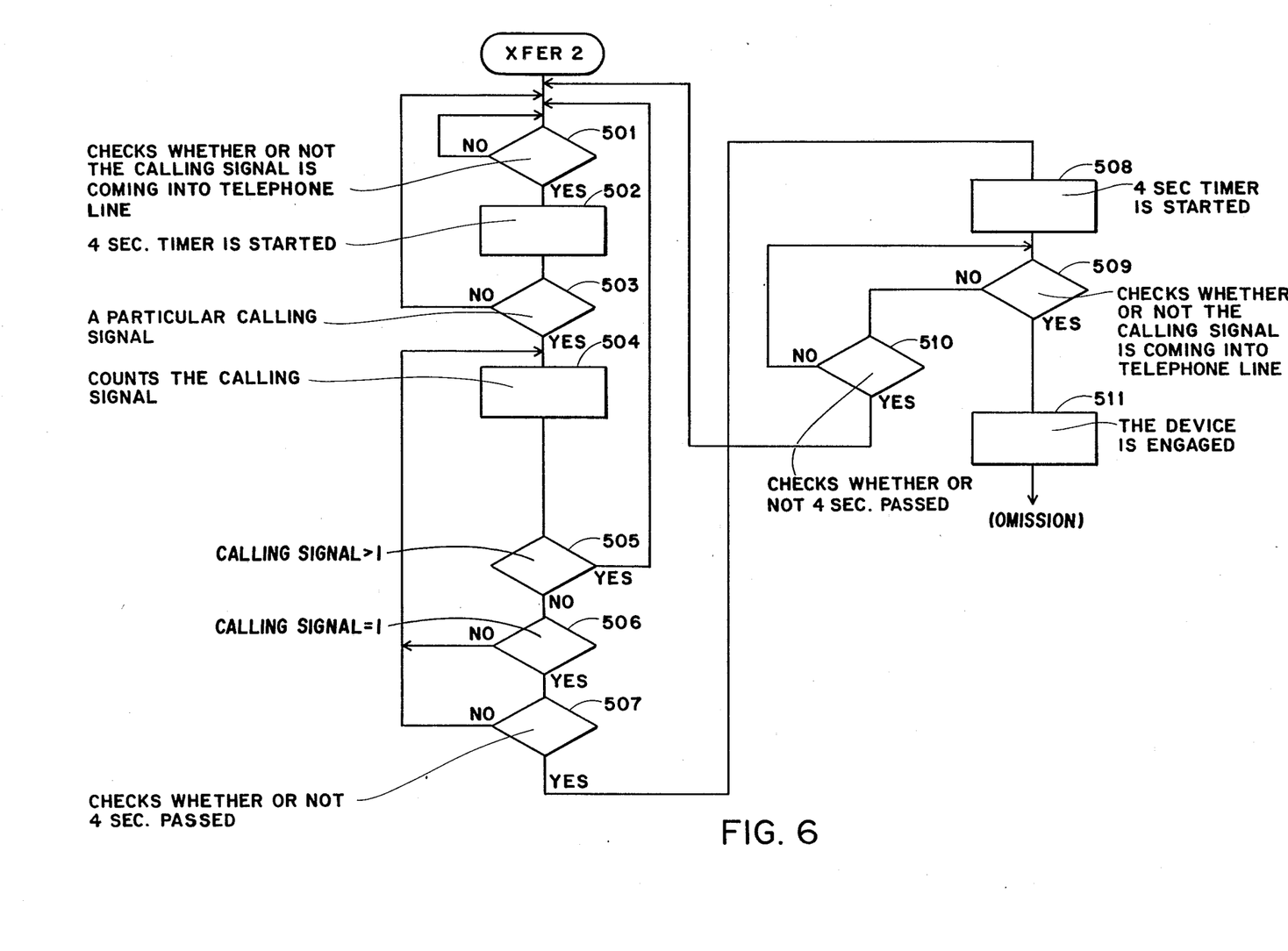
FIG. 6 is a flow chart of the operation of second embodiment.

Operation in a second embodiment will be now described with reference to the flow chart in FIG. 6. In above first embodiment, in order to change the call forwarded party or cancel the call forwarding, it is necessary to call the remote control operator from the device by auto dialing; whereas in the second embodiment, said operation is not necessary. Accordingly, the switches 7 and 8 and the display 9 in FIG. 1, as well as the corresponding programs, are not required in the second embodiment. Further, in the first embodiment the remote control operator has to be present in the vicinity of his telephone; whereas in the second embodiment it is arranged that he may change the call forwarded party or cancel the call forwarding using any outside telephone set. Steps 501 to 507 in FIG. 6 are identical to steps 201 to 209 in FIG. 2, wherein the remote control operator starts calling the device from the outside telephone set, hangs up immediately after the ring back tone sounds and calls the device again immediately by manual dialing. When said second calling is performed within 4 seconds elapsed in step 508, the device is engaged in step 511 through steps 509 and 510. Thus the voice circuit between the remote control operator and the device is established. Once said voice circuit is established, he may change the call forwarded party or cancel the call forwarding to the device, in the same way as described in above first embodiment.

Moreover, though omitted in the flow chart, when an incoming call from the third party is received before the remote control operator calls the device again after hearing the ring back tone, there is the possibility that the loop circuit between said incoming call from the third party and the device may be established unwillingly. In order to avoid this operation, it is possible to arrange that the remote control operator calls the device and hangs up after hearing the ring back tone repeatedly many times, and the device is engaged when the number of times of said operation by the remote control operator coincides with a predetermined number of times preset in the program.

Although certain preferred embodiments have been shown and described, it should be understood that many changes and modifications may be made therein without departing from the scope of the invention.

I claim:

1. A call forwarding control apparatus for use on a subscriber telephone line connected to a central office of a type which causes a call forwarding function (1) to be activated in response to provision of a predetermined first code sequence applied together with a destination telephone number on the line to the central office, and (2) to be deactivated in response to provision of a predetermined second code sequence on the line to the central office, and wherein the central office provides particular ring back signals in response to an incoming call when call forwarding is activated and otherwise provides usual ring back signals, said apparatus comprising:

memory means storing said predetermined first and second code sequences and having means for storing call forwarding telephone numbers;

means for prestoring in said memory means a first call forwarding telephone number and for registering said first call forwarding telephone number with the central office;

means for receiving an incoming call from a caller and for detecting a hang up of said telephone upon reception by the caller of a first one of said particular ring back signals from the central office indicating that call forwarding is activated, said hang up by the caller of said telephone cancelling forwarding of said incoming call;

means responsive to said hang up detected by said receiving and detecting means for auto-dialing the caller at the prestored telephone number;

means for storing in the memory means a second call forwarding telephone number sent on the line by the caller; and means controllable by the caller for selectively (a) transferring the second call forwarding telephone number together with the predetermined first code sequence to the central office for replacing said first call forwarding telephone number therein by said second call forwarding telephone number, or (b) transferring said predetermined second code sequence to said central office for deactivating said call forwarding function.

2. A call forwarding control apparatus for use on a subscriber telephone line connected to a central office of a type which causes a call forwarding function (1) to be activated in response to provision of a predetermined first code sequence applied together with a destination telephone number on the line to the central office, and (2) to be deactivated in response to provision of a predetermined second code sequence on the line to the central office, and wherein the central office provides particular ring back signals in response to an incoming call when call forwarding is activated and otherwise provides usual ring back signals, said apparatus comprising:

memory means storing said predetermined first and second code sequences and having means for storing call forwarding telephone numbers;

means for receiving an incoming call from a caller and for detecting a hang up of said telephone upon reception by the caller of a first one of said particular ring back signals from the central office indicating that call forwarding is activated, said hang up by the caller of said telephone cancelling forwarding of said incoming call;

timer means for establishing a predetermined time interval; and means responsive to another call from the caller received within said predetermined time interval for storing in the memory means a second call forwarding telephone number sent by the caller and controllable by the caller for selectively (a) transferring the second call forwarding telephone number together with the predetermined first code sequence to the central office for replacing said first call forwarding telephone number therein by said second call forwarding telephone number, or (b) transferring said predetermined second code sequence to said central office for deactivating said call forwarding function.

* * * * *